US010348338B2

(12) United States Patent
Marr et al.

(10) Patent No.: US 10,348,338 B2
(45) Date of Patent: Jul. 9, 2019

(54) ADAPTIVE CHANNELIZER

(71) Applicant: Raytheon Company, Waltham, MA (US)

(72) Inventors: Harry B. Marr, Manhattan Beach, CA (US); Mark J. Rosker, Falls Church, VA (US); Justin Hodiak, Arlington, VA (US); Charles T. Hansen, Palos Verdes Estates, CA (US)

(73) Assignee: RAYTHEON COMPANY, Waltham, MA (US)

( * ) Notice: Subject to any disclaimer, the term of this patent is extended or adjusted under 35 U.S.C. 154(b) by 53 days.

(21) Appl. No.: 15/287,356

(22) Filed: Oct. 6, 2016

(65) Prior Publication Data
US 2018/0102926 A1  Apr. 12, 2018

(51) Int. Cl.
*H04B 1/00* (2006.01)
*H04L 5/06* (2006.01)

(52) U.S. Cl.
CPC .......... *H04B 1/005* (2013.01); *H04B 1/0053* (2013.01); *H04B 1/0057* (2013.01); *H04L 5/06* (2013.01)

(58) Field of Classification Search
CPC .......... H04B 1/005; H04B 1/0053; H04L 5/06
See application file for complete search history.

(56) References Cited

U.S. PATENT DOCUMENTS

| 2,989,744 A | 6/1961 | Pettit |
| 3,170,158 A | 2/1965 | Rotman |
| 3,720,952 A | 3/1973 | Lawsine |
| 3,992,099 A | 11/1976 | Laughlin |
| 4,328,496 A | 5/1982 | White |
| 4,613,863 A | 9/1986 | Mitchell |
| 5,032,839 A | 7/1991 | Even-Or |
| 5,563,819 A | 10/1996 | Nelson |
| 5,717,620 A | 2/1998 | Williams |

(Continued)

FOREIGN PATENT DOCUMENTS

| CA | 1229926 A1 | 12/1987 |
| CN | 101241535 A | 8/2008 |

(Continued)

OTHER PUBLICATIONS

International Search Report and Written Opinion for PCT/US2017/054862; International Filing Date, Oct. 3, 2017; dated Dec. 7, 2017; 5 pages.

(Continued)

Primary Examiner — Ankur Jain
(74) Attorney, Agent, or Firm — Cantor Colburn LLP

(57) ABSTRACT

A signal identification system includes an analog adaptive channelizer having a plurality of channels. Each channel has a channel size defined by a bandwidth and a gain. The system further includes an electronic signal identification (ID) controller in signal communication with the analog adaptive channelizer. The ID controller is configured to determine a dynamic range event that modifies an energy level of an affected channel among the plurality of channels, and output a feedback signal including channel parameters based on the dynamic range event. The analog adaptive channelizer actively adjusts at least one of the bandwidth and the gain of the affected channel based on the feedback to change the channel size of the affected channel.

16 Claims, 8 Drawing Sheets

(56) References Cited

U.S. PATENT DOCUMENTS

| | | | |
|---|---|---|---|
| 6,002,722 A | 12/1999 | Wu | |
| 6,052,085 A | 4/2000 | Hanson | |
| 6,091,704 A | 7/2000 | Butash | |
| 6,104,346 A | 8/2000 | Rudish | |
| 6,181,740 B1 | 1/2001 | Yasuda | |
| 6,222,409 B1 | 4/2001 | Kieda | |
| 6,285,197 B2 | 9/2001 | Walker et al. | |
| 6,397,050 B1 | 5/2002 | Peterson et al. | |
| 6,760,342 B1* | 7/2004 | Skones | H04B 1/0003 370/343 |
| 6,898,235 B1 | 5/2005 | Carlin et al. | |
| 6,954,614 B2 | 10/2005 | Jespersen | |
| 7,047,043 B2* | 5/2006 | Reilly | H04B 7/0822 455/562.1 |
| 7,324,036 B2* | 1/2008 | Petre | H03M 1/121 341/110 |
| 7,801,228 B2 | 9/2010 | Lehne et al. | |
| 8,045,654 B1* | 10/2011 | Anderson | H04B 1/69 370/210 |
| 8,174,325 B1 | 5/2012 | Leung | |
| 8,175,199 B2* | 5/2012 | Nakatani | H03L 7/099 331/4 |
| 8,418,210 B2* | 4/2013 | Knutson | H04N 7/20 725/105 |
| 8,578,256 B2 | 11/2013 | Graef | |
| 9,118,513 B2* | 8/2015 | Velazquez | H04B 1/001 |
| 9,287,983 B2* | 3/2016 | Plankl | H04B 10/278 |
| 9,484,971 B2 | 11/2016 | Corbalis | |
| 9,831,933 B1* | 11/2017 | Chieh | H04B 7/0617 |
| 10,084,587 B1* | 9/2018 | Thompson | H04L 5/06 |
| 2001/0011893 A1 | 8/2001 | Walker et al. | |
| 2001/0022811 A1 | 9/2001 | Lillington | |
| 2002/0010870 A1 | 1/2002 | Gardner | |
| 2003/0016770 A1 | 1/2003 | Trans et al. | |
| 2003/0076899 A1 | 4/2003 | Kumar et al. | |
| 2003/0112904 A1 | 6/2003 | Fuller et al. | |
| 2003/0133524 A1 | 7/2003 | Miller et al. | |
| 2004/0189384 A1 | 9/2004 | Kemna et al. | |
| 2005/0094722 A1 | 5/2005 | Takatori et al. | |
| 2005/0156775 A1 | 7/2005 | Petre | |
| 2007/0223607 A1 | 9/2007 | Lehne et al. | |
| 2007/0223754 A1 | 9/2007 | Roeck | |
| 2009/0163161 A1 | 6/2009 | Robinson et al. | |
| 2009/0239551 A1 | 9/2009 | Woodsum | |
| 2010/0271107 A1 | 10/2010 | Tran et al. | |
| 2010/0315292 A1 | 12/2010 | Ciu et al. | |
| 2011/0103430 A1 | 5/2011 | Witrisal | |
| 2011/0260911 A1 | 10/2011 | Sapp | |
| 2011/0274222 A1 | 11/2011 | Hinson | |
| 2012/0235646 A1 | 9/2012 | Lo et al. | |
| 2014/0105416 A1 | 4/2014 | Huttunen et al. | |
| 2014/0133603 A1 | 5/2014 | Velazquez | |
| 2014/0210666 A1 | 7/2014 | Maltsev et al. | |
| 2014/0241463 A1 | 8/2014 | Leenaerts et al. | |
| 2014/0286444 A1 | 9/2014 | Au et al. | |
| 2015/0234030 A1 | 8/2015 | Marr | |
| 2018/0248575 A1 | 8/2018 | Bardin et al. | |

FOREIGN PATENT DOCUMENTS

| | | |
|---|---|---|
| EP | 0344794 A2 | 12/1989 |
| EP | 1596220 B1 | 11/2005 |
| EP | 2425635 A1 | 8/2013 |
| EP | 2728770 A2 | 5/2014 |
| EP | 2779473 A2 | 9/2014 |
| FR | 2689249 A1 | 10/1993 |
| GB | 2308034 A | 6/1997 |
| JP | 1992078584 D1 | 7/1992 |
| JP | H05298827 A | 11/1993 |
| JP | 1998221429 D4 | 8/1998 |
| JP | 2001208831 A | 8/2001 |
| JP | 2002286831 D2 | 10/2002 |
| JP | 2008164479 D3 | 7/2008 |
| JP | 2010127645 A | 6/2010 |
| KR | 20080020078 A | 3/2008 |
| WO | 9306502 A1 | 4/1993 |
| WO | 99039517 A3 | 10/1999 |
| WO | 0011823 A1 | 3/2000 |
| WO | 0041340 A1 | 7/2000 |
| WO | 2005050241 A3 | 6/2005 |
| WO | 2012024507 A2 | 2/2012 |

OTHER PUBLICATIONS

Japanese Office Action for Patent Application No. 2016-568024; dated Oct. 31, 2017; 2 pages.

Grollitsch et al., "A 1.4 psrms-Period-Jitter TDC-less Fractional-N Digital PLL with Digitally Controlled Ring Oscillator in 65nm CMOS" Solid-State Circuits Conference Digest of Technical Papers (ISSCC), 2010 IEEE International. IEEE, 2010, pp. 478-480.

Magalhaes et al. "RF and IF channelizers for wide-band sensing in cognitive/software-defined-radio receivers." Microwave Integrated Circuits Conference (EuMIC), 2012 7th European. IEEE, 2012, pp. 778-781.

Ozalevli et al., "VLSI Implementation of a Reconfigurable, Mixed-Signal Finite Impulse Response Filter" School of Electrical and Computer Engineering Georgia Institute of Technology, 2007, pp. 2168-2171.

Sewter et al., "A CMOS finite impulse response filter with a crossover traveling wave topology for equalization up to 30 Gb/s" IEEE Journal of Solid-State Circuits, vol. 41, No. 4, Apr. 2006 (9 pages).

Tasca et al., "A 2.9-to-4.0 GHz Fractional-N Digital PLL with Bang-Bang Phase Detector and 560fs rms Integrated Jitter at 4.5 mW Power." IEEE Journal of Solid-State Circuits, vol. 46, No. 12, Dec. 2011, pp. 2745-2758.

HOUGHTON et al., "Direction finding on spread-spectrum signals using the time-domain filtered cross spectral density", IEEE Proceedings of Radar, Sonar and Navigation, vol. 144, No. 6, Dec. 1997, pp. 315-320.

International Search Report and Written Opinion; International Application No. PCT/US2015/016298; International Filing Date: Feb. 18, 2015; dated May 11, 2015; 14 pages.

International Search Report and Written Opinion; International Application No. PCT/US2015/033207; International Filing Date: May 29, 2015; dated Sep. 17, 2015; 11 pages.

International Search Report and Written Opinion; PCT Application No. PCT/US2015/025537; International Filing Date: Apr. 13, 2015; dated Jul. 28, 2015; 12 pages.

International Preliminary Report on Patentability for PCT/US2015/016298, dated Aug. 23, 2016, 8 pages.

International Preliminary Report on Patentability for PCT/US2015/039877, dated Mar. 21, 2017, 8 pages.

International Preliminary Report on Patentability for PCT/US2015/033207, dated Dec. 6, 2016, 7 pages.

International Preliminary Report on Patentability for PCT/US2015/025537, dated Dec. 20, 2016, 7 pages.

Lambrecht et al., "True-Time-Delay Beamforming With a Rotman-Lens for Ultrawideband Antenna Systems", IEEE Transactions on Antennas and Propagation, vol. 58, No. 10, Oct. 2010, pp. 3189-3195.

Lehne et al., "A 0.13-um 1-GS/s CMOS Discrete-Time FFT Processor for Ultra-Wideband OFDM Wireless Receivers", IEEE Transactions on Microwave Theory and Techniques, vol. 59, No. 6, Jun. 2011, pp. 1639-1650.

Lillington, "Flexible channelisation architectures for Software Defined Radio front ends using a Tuneable Pipelined Frequency Transform", IET Seminar Digest, vol. 2003, No. 1, 2003, pp. 1-13.

Lillington, "The pipelined frequency transform (PFT)", RF Engines, Electronic Engineering, Jun. 17, 2002, pp. 1-5.

Mahesh et al., "Coefficient decimation approach for realizing reconfigurable finite impulse response filters," IEEE International Symposium on Circuits and Systems, ISCAS, May 18-21, 2008, pp. 81-84.

Mahesh et al., "Reconfigurable low area complexity filter bank architecture based on frequency response masking for nonuniform

(56) References Cited

OTHER PUBLICATIONS channelization in software radio receivers", IEEE Transactions on Aerospace and Electronic Systems, vol. 47, No. 2, Apr. 2011.
Navarro et al. "Non-uniform channelization methods for next generation SDR PMR base stations", 2011 IEEE Symposium on Computers and Communications, Jul. 2011, pp. 620-625.
PCT International Search Report and Written Opinion; International Application No. PCT/US2015/039877; International Filing Date: Jul. 10, 2015; dated Oct. 6, 2015; 12 pages.
Sju, "Pipelined Frequency Transform PFT", RF Engines Limited Data Sheet, Apr. 29, 2002, pp. 1-25.
Smitha et al., "A new low power reconfigurable decimation interpolation and masking based filter architecture for channel adaptation in cognitive radio handsets," Physical Communication, Jan. 2, 2009, pp. 47-57.
Suh et al., "Low-Power Discrete Fourier Transform for OFDM: A Programmable Analog Approach", IEEE Transactions on Circuits and Systems I: Regular Papers, IEEE, vol. 58, No. 2, Feb. 1, 2011, pp. 290-298.
Zhang et al., "Reconfigurable beam forming using phase-aligned Rotman lens", www.ietdl.org, The Institute of Engineering and Technology, 2012, pp. 326-330.
Ahnstrom et al., "Detection and direction-finding of spread spectrum signals using correlation and narrowband interference rejection", Proc. Nordic Matlab Conference, Copenhagen, Denmark, 2003, 5 pages.
Akpa et al., "N-parallel filter bank equivalent to tree structure", Electrical and Computer Engineering Conference Proceedings, 1994, pp. 494-496.
Balakrishnan et al., "Implementation of radix-2 and split-radix fast fourier transform algorithm using current mirrors", 2013 International Conference on Circuits, Power and Computing Technologies (ICCPCT), IEEE, Mar. 20, 2013, pp. 730-735.
Chang et al., "Reconfigurable Architectures for Low Complexity Software Radio Channelizers using Hybrid Filter Banks," 10th IEEE Singapore International Conference on Communication systems, Oct. 2006, pp. 1-5.
Darak et al., "A reconfigurable filter bank for uniform and non-uniform channelization in multi-standard wireless communication receivers," IEEE 17th International Conference on Telecommunications (ICT), Apr. 4-7, 2010, pp. 951-956.
Holler et al. "A 2-20-GHz Analog Lag Correlator for Radio Interferometry", IEEE Transactions on Instrumentation and Measurement, vol. 61, No. 8, Aug. 2012, pp. 2253-2261.
Lehne et al., "A 0.13-urn 1-GS/s CMOS Discrete-Time FFT Processor for Ultra-Wideband OFDM Wireless deceivers", IEEE Transactions on Microwave Theory and Techniques, vol. 59, No. 6, Jun. 2011, pp. 1639-1650.
Mahesh et al., "Reconfigurable low area complexity filter bank architecture based on frequency response masking for nonuniform channelization in software radio receivers", IEEE Transactions on Aerospace and Electronic Systems, vol. 7, No. 2, Apr. 2011.
Navarro et al. "Non-uniform channelization methods for next generation SDR PMR base stations", 2011 IEEE ymposium on Computers and Communications, Jul. 2011, pp. 620-625.
PCT International Search Report and Written Opinion; International Application No. PCT/U52015/039877; lnternational Filing Date: Jul. 10, 2015; dated Oct. 6, 2015; 12 pages.
International Search Report and Written Opinion for PCT/US2018/035048 International Filing Date, May 30, 2018; dated Oct. 9, 2018 (17 pages).
Japanese Office Action for Patent Application No. 2016-568024; dated Jun. 19, 2018 (4 pages).
Swenson et al.; "Discrete-Time Channelizers for Aeronautical Telemetry: Part I—Fixed Bandwidth"; Oct. 22, 2012; https://users.ece.cmu.edu/~brianswe/pdfs/channelizer.pdf.[retrieved on Sep. 19, 2018] (14 pages).
Swenson et al.; "Discrete-Time Channelizers for Aeronautical Telemetry: Part II—Fixed Bandwidth"; Oct. 22, 2012; https://users.ece.cmu.edu/~brianswe/pdfs/channelizer2.pdf [retrieved on Sep. 19, 2018] (13 pages).
Office Action for U.S. Appl. No. 16/123,150; Application Filing Date Sep. 6, 2018; dated Apr. 23, 2019 (6 pages).

\* cited by examiner

ADAPTIVE CHANNELIZER

BACKGROUND

The present invention relates to signal processing systems, and more specifically, to analog channelizers.

Hardware implementations for wideband systems cannot keep pace with existing bandwidth requirement demands. Therefore, a channelizer can be used to reduce a signal band into a plurality of sub-bands. Each of the sub-bands can then be processed on parallel channels.

Conventional channelizer circuits are designed to operate on static channels and are defined at compile time. It may be desirable, however, to rely on a channelizer capable of operating on dynamic channels to react in real-time to a changing radio frequency (RF) environment. For example, an object (e.g., a threat) to be detected can effectively hop center frequencies, and may thereby at least temporarily elude detection. Furthermore, the object or threat might only be detectable for short periods of time (e.g., a so-called pop-up or pulse object/threat).

Conventional signal processing applications typically rely on digital channelizers to decimate an incoming RF signal into frequency channels and provide filter shaping. Digital channelizers, however, typically utilize a field-programmable gate array (FPGA). Therefore, digital channelizers may fail to capture such pop-up or pulse objects/threats.

SUMMARY

According to a non-limiting embodiment, a signal identification system includes an analog adaptive channelizer having a plurality of channels. Each channel has a channel size defined by a bandwidth and a gain. The system further includes an electronic signal identification (ID) controller in signal communication with the analog adaptive channelizer. The ID controller is configured to determine a dynamic range event that modifies an energy level of an affected channel among the plurality of channels, and output a feedback signal including channel parameters based on the dynamic range event. The analog adaptive channelizer actively adjusts at least one of the bandwidth and the gain of the affected channel based on the feedback to change the channel size of the affected channel.

According to another non-limiting embodiment, an adaptive channelizer comprises a plurality of channels having a channel size defined by a bandwidth and a gain, each channel comprising. A digitally controlled oscillator (DCO) unit is configured to generate a local oscillating frequency signal based on a feedback signal that is output in response to a dynamic range event of an affected channel among the plurality of channels. The dynamic range event modifies an energy level of the affected channel. The adaptive channelizer further includes a mixer and an adaptive filter unit. The mixer is in signal communication with the DCO unit, and is configured to apply the local oscillating frequency signal to the affected channel so as to adjust a center of frequency of the affected channel. The adaptive filter unit is in signal communication with the mixer, and is configured to actively adjust a bandwidth of the affected channel based on the feedback signal. In response to adjusting the center of frequency and the adjusted bandwidth, the size of the affected channel is changed to remove the dynamic range event.

According to still another non-limiting embodiment, a method is provided to control a dynamic range of an adaptive channelizer including a plurality of channels having a channel size defined by a bandwidth and a gain. The method comprises determining a dynamic range event that modifies an energy level of an affected channel among the plurality of channels, and outputting a feedback signal including channel parameters based on the dynamic range event. The method further comprises actively adjusting the channel size of the affected channel based on the feedback to reduce a dynamic range of the affected channel to the set dynamic range value or below the set dynamic range value.

Additional features are realized through the techniques of the present invention. Other non-limiting embodiments of the invention are described in detail herein and are considered a part of the claimed invention. For a better understanding of the invention and inventive features, refer to the description and to the drawings.

BRIEF DESCRIPTION OF THE SEVERAL VIEWS OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Various embodiments described herein provide an adaptive analog channelizer capable of increasing system level dynamic range. It is not uncommon for various electronic support measure applications to require a very large dynamic range, e.g., 100 decibels (dB) or greater, over a very large bandwidth, e.g., 1 gigahertz (GHz) or more, in order to detect all possible signals or objects. Conventional analog channelizers utilize a time-interleaved approach which scans through both radio frequency (RF) channels and sub-channels. The scanning approach conducted by conventional analog channelizers includes slicing the GHz bandwidth to obtain a number of RF sub-channels (e.g., GHz sub-channels) and further slicing the RF sub-channels into a number of MHz sub-channels. However, the conventional time-interleaved approach requires a static dynamic range (e.g., 100 dB) across all signals while maintaining constant voltage amplitudes after down sampling. As a result, high-amplitude signals can saturate the analog-to-digital converter (ADC) such that lower-amplitude signals are lost.

Unlike conventional analog channelizers, the adaptive analog channelizer according to various non-limiting embodiments channelizes the initial spectrum with a priori (i.e., derived) channel setting. The adaptive analog channelizer determines the dynamic changing power levels in each channel, and can adjust, i.e., adapt, one or more of the channels based on the changing power levels. In at least one embodiment, the channel is adapted by adjusting the center frequency, bandwidth and/or gain of the channels with parameters such that no channel will require more than a selected dynamic range based on the input RF signal. This selected dynamic range may be much less (e.g., 50 dB) than what is achieved by conventional analog channelizers. Accordingly, the dynamic range required per channel and per ADC is greatly reduced compared to conventional analog channelizers. In addition, adapting the channel changes the size of the channel. In this manner, the adaptive analog channelizer allows for adaptively tuning the probability of multiple signals falling in the same channel.

Figure 1:
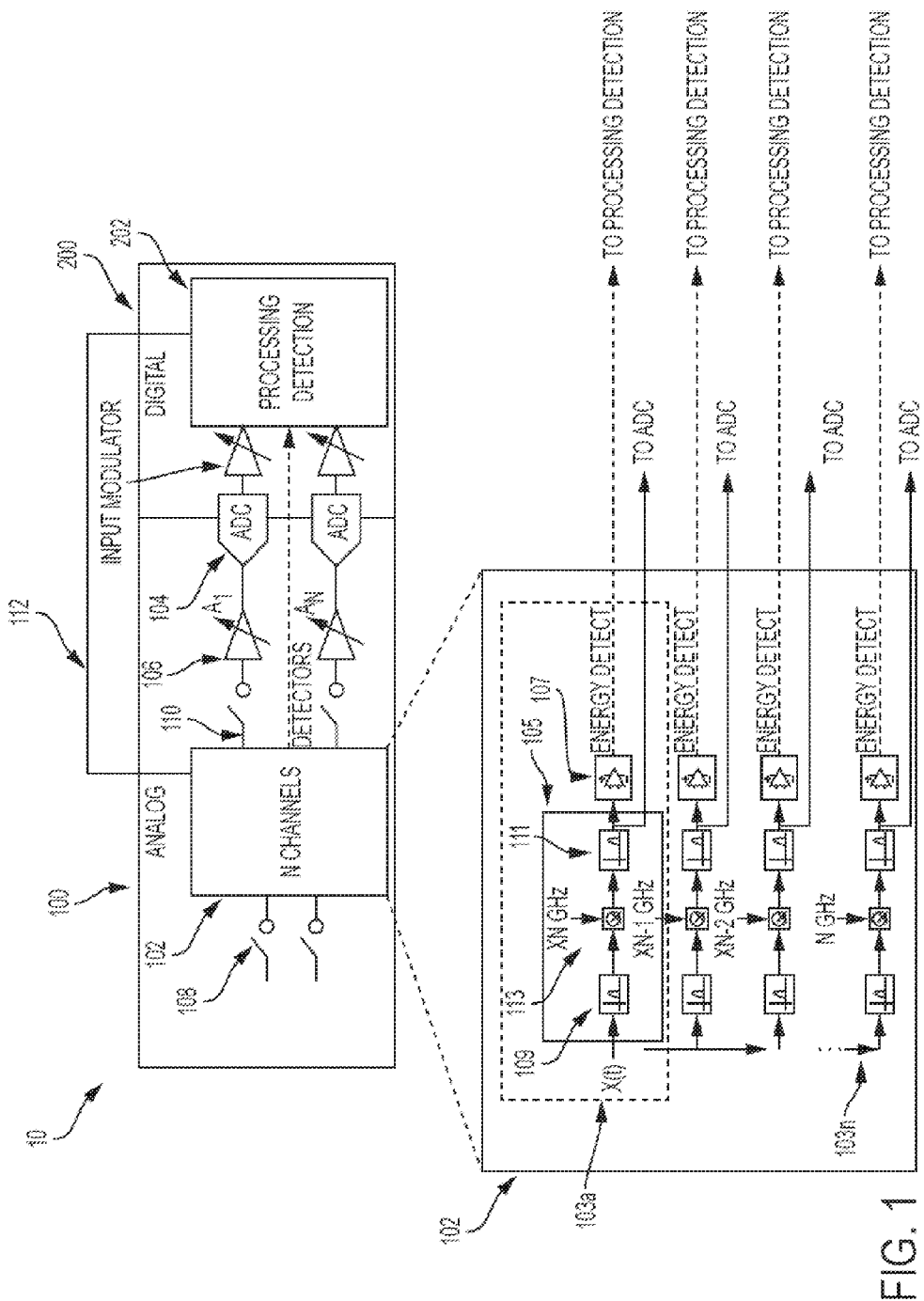
FIG. 1 is a block diagram illustrating an adaptive channelizer in signal communication with a digital signal identification stage according to a non-limiting embodiment.

Turning now to FIG. 1, a signal identification system 10 is illustrated according to a non-limiting embodiment. The signal identification system 10 includes an adaptive discrete-time analog channelizer 100 (hereinafter referred to as an adaptive channelizer 100) in signal communication with a digital signal identification stage 200 is illustrated according to a non-limiting embodiment. The adaptive channelizer 100 includes a channel array 102 comprising one or more individual channels (e.g., n channels) 103. Accordingly, the channelizer 100 reduces a signal band of an incoming RF signal into one or more sub-bands. Each sub-band is then delivered to respective channel and can be processed in parallel. A channelizer may be used to reduce a signal band into a plurality of sub-bands. Each of the sub-bands can then be processed on parallel channels.

The individual channels 103 include a bandpass downsampler 105 configured to actively adapt (i.e., adjust) the characteristics of a respective channel 103. The bandpass downsampler 105 includes a bandpass filter 109, a low-pass filter 111, and a mixer 113. The bandpass filter 109 has narrow bandpass to support the desired sample rate. The low-pass filter 111 is constructed as an active low-pass filter 111, for example, that receives a clock signal that is lower than the frequency of the RF input signal. In this manner, the signal delivered through the channel 103 is aliased down (i.e., down sampled) to the first Nyquist zone while remaining unambiguous. The mixer 113 is configured to combine various channel parameters (e.g., amplitude, bandwidth, and/or center frequency) with the input RF signal upstream from the low-pass filter 111. In this manner, each individual channel 103 can be actively adapted with varying parameters based on the detected energy of the respective channel 103.

In at least one embodiment, each channel 103 may also include a channel energy detector 107 configured to detect an amplitude level of the respective channel 103. The detected amplitude level is utilized to determine whether the respective channel 103 is experiencing a dynamic range event. The dynamic range event includes, but is not limited to, a saturated channel, under-powered signal event, under-powered channel, etc., for example, as discussed in greater detail below. The channel energy detector 107 is configured, for example, as an analog comparator including a first input connected to the output of the bandpass downsampler 105, and a second input connected to a tunable voltage supply which sets a reference voltage. In this manner, the channel energy detector 107 outputs an energy detect signal indicating the existence of a dynamic range event (e.g., saturated channel, under-powered signal event, etc.) when the output of the bandpass downsampler 105 exceeds the reference voltage. In some embodiments, the channel energy detector 107 is omitted from the channel 103 and the process of determining the amplitude level and detecting the dynamic range event is performed at the digital signal identification stage 200.

Figure 2A:
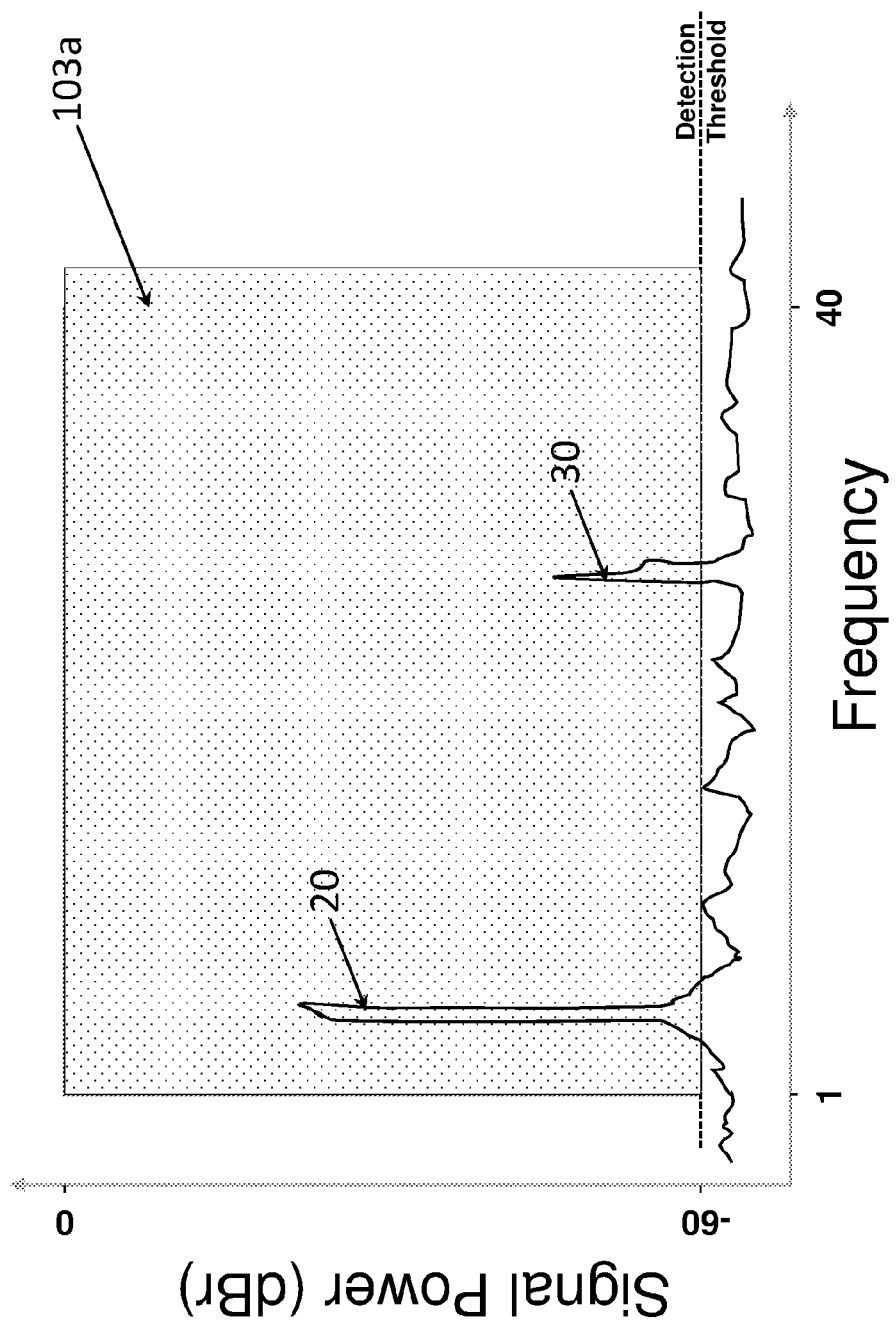
FIG. 2A illustrates a channel of an adaptive channel experiencing a dynamic range event.
Figure 2B:
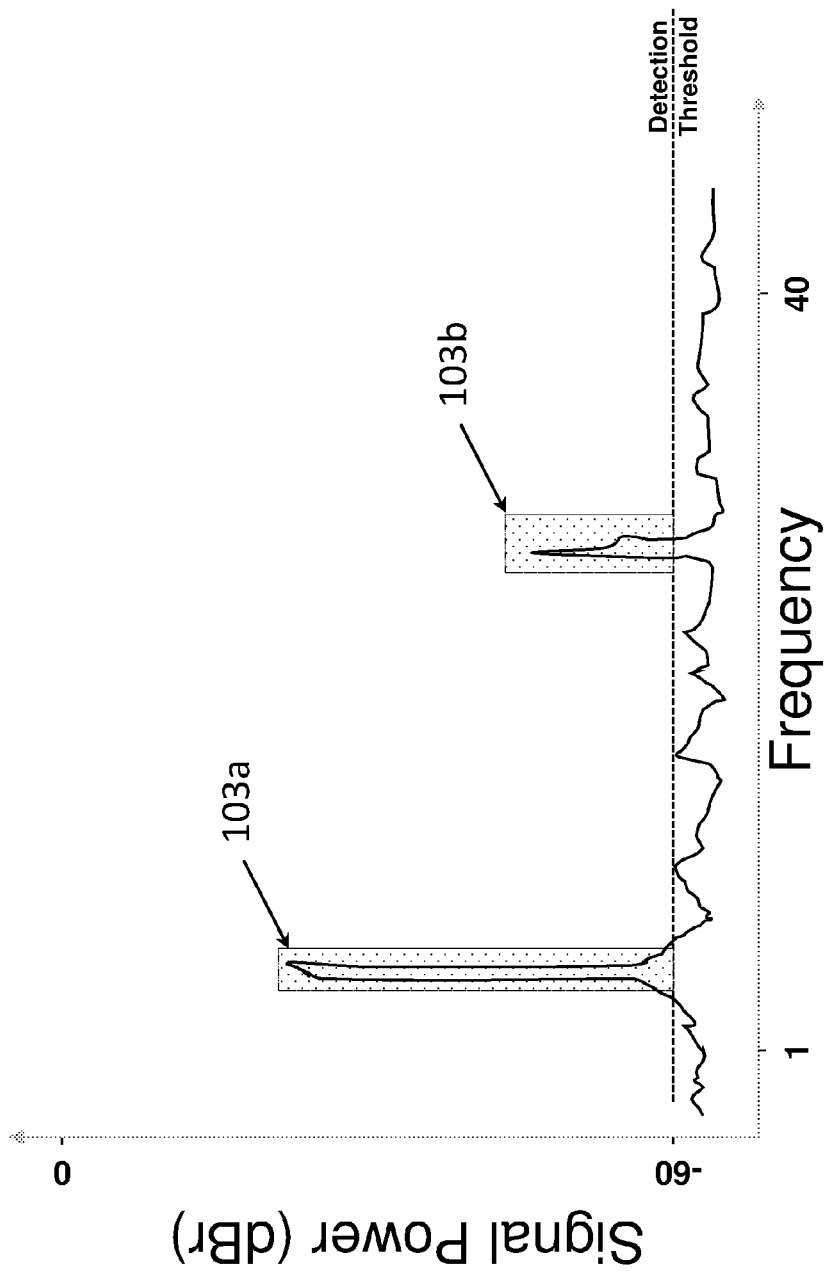
FIG. 2B illustrates an operation of isolating a high-amplitude signal in a single individual channel to control the dynamic range of the channel according to a non-limiting embodiment.

Each channel 103 is in signal communication with a respective ADC 104. The ADCs 104 can be constructed as a plurality of interleaved ADCs 104. In at least one embodiment, the adaptive channelizer 100 further includes a tunable gain amplifier 106. As shown in FIG. 2A, a dynamic range event can occur in one or more channels 103a (e.g., channel saturation exists where a first signal 20 having a high amplitude and a second signal 30 having a low amplitude exist in one or more individual channels 103a). According to at least one embodiment, the affected channel 103a experiencing the dynamic range event can be adjusted such that the high-amplitude signal 20 is isolated in its own channel 103a by reducing the bandwidth and adjusting the center frequency of the respective channel 103a (see FIG. 2B). In this case, the gain amplifier 106 connected to the adjusted channel 103a (i.e., the channel isolating the high-amplitude signal) can be actively varied (e.g., tuned down) to prevent saturation of the respective channel 103a. In a similar instance, a gain amplifier 106 may also actively vary (e.g., tune up) the gain of the channel 103b now isolating the low-amplitude signal 30 as further illustrated in FIG. 2B. In an under-powered signal event where the signal is blow the noise, the gain can be increased such that the noisy signal is close to the full scale range of the channel 103b. Accordingly, signal power differentials within a single channel are greatly reduced, while also achieving significant reduction in the amount of captured data (i.e., the area of power spectrum). The magnitude of the reduced data capture area may depend on the density of signal environment.

The adaptive channelizer 100 may further include an RF input switch 108 and/or a gain amplifier enable switch 110. The input of each channel is connected to a RF input switch 108, while the output of each channel is connected to a channel enable switch 110. The RF input switch 108 can be operated to selectively deliver one or more RF input signals to the adaptive channelizer 100, while the channel enable switch 110 can be operated to selectively enable one or more of the gain amplifier 106. That is, controlling the channel enable switch 110 either enables or disables a respective channel output from the channelizer 100 thereby controlling the gain injected into the digital signal identification stage 200. Either the RF input switch 108 and/or the channel enable switch 110 can be used to can be used to power-down unused individual channels. This may be desirable when two signals existing on two particular channels are of interest, while the other channels do not require usage and therefore can be power-downed.

According to at least one non-limiting embodiment, dynamic range events (e.g., saturation, an under-powered signal event, etc.) that modify the energy level in one or more individual channels can be detected. Based on the detected dynamic range event, a feedback signal 112 indicative of the dynamic range event is generated and delivered to the adaptive channelizer 100. The feedback signal indicates one or more desired filter coefficients (e.g., bandwidth frequency, center of frequency value, etc.) based on the energy detected in an individual channel. In at least one embodiment, the feedback signal 112 is generated by a signal hardware signal identification (ID) controller 202 included in the digital signal identification stage 200.

For example, the signal ID controller 202 may receive the output from each ADC and perform energy detection calculations on each output to determine whether a respective channel is experiencing a dynamic range event, e.g., whether one or more channels are saturated, or under-powered. The energy detection calculations include calculations indicating whether a particular ADC is saturated. In at least one non-limiting embodiment, a saturation event results when signal clipping occurs such that the signal is higher than the voltage rail causing the voltage to saturate to the Vdd/Vss. A saturation event can also occur, for example, when non-linearities occur that result from too high a signal level even though the signal is not completely clipped. In response to detecting a dynamic range event, the signal ID controller 202 generates the feedback signal 112, which then delivered to the adaptive channelizer 100. Based on the feedback signal 112, the adaptive channelizer actively adjusts a respective channel (i.e., a channel experiencing the dynamic range event) so as to isolate one or more high-amplitude signals causing the dynamic range event (i.e., causing saturation of the affected channel). The active adjustment includes reducing the bandwidth and adjusting the center frequency of a particular channel to isolate high-amplitude signals from low amplitude signals. The channelizer 100 may further control the gain amplifier 106 to actively vary the gain of the affected channel and prevent saturation. The active adjustment of the channelizer 100 may also include actively filtering one or more channels to eliminate distortions in the affected channel. This active filtering technique provided by the adaptive channelizer is described in greater detail below.

Turning to FIG. 2, a bandpass downsampler 105 included in a respective channel 103 of an adaptive channelizer 100 is illustrated according to a non-limiting embodiment. As mentioned above, the bandpass downsampler 105 includes an adaptive filter 114, a mixer 113, and an oscillator unit 116. In at least one embodiment, the adaptive filter 114 is an adaptive (i.e., tunable) polyphase decimating finite impulse response (FIR) filter array 114 which is discussed in greater detail below. The oscillator unit 116 can be configured to provide a local oscillating (LO) frequency to a respective channel 103. The oscillator unit 116 may be configured as a digitally-controlled oscillator (DCO) unit 116, for example, and includes an input that receives the feedback signal 112 and an output connected to the mixer 113. In at least one embodiment, the frequency input by the DCO unit 116 is controlled by a digital word stored into a register bank of the DCO 116. The digital word can be fed from the backend processing included in the feedback signal or control line 112. In at least one embodiment, the control line 112 is a standard discrete line such as, for example, a rapid serial I/O (RSIO), Peripheral Component Interconnect Express (PCIe), or low voltage differential signaling lines (LVDS) from a field programmable gate array (FPGA) or central processing unit (CPU). The oscillator unit 116 operates, for example, below 10 picoseconds (ps) jitter through the S-band, below 200 femtoseconds (fs) jitter through the Ku-band, and below 5 milliwatts (mW) of power.

The feedback signal 112 provides the oscillator unit 116 with channel parameters for selecting a center of frequency based on the detected energy of a respective channel 103. For instance, the oscillator unit 116 may output a local oscillating (LO) frequency signal that adjusts or runes the center frequency of the respective channel 103 from 1.5 GHz to 2.0 GHz, and the mixer 113 applies the parameters such that the individual channel is actively adapted based on the channel's detected energy.

Figure 4:
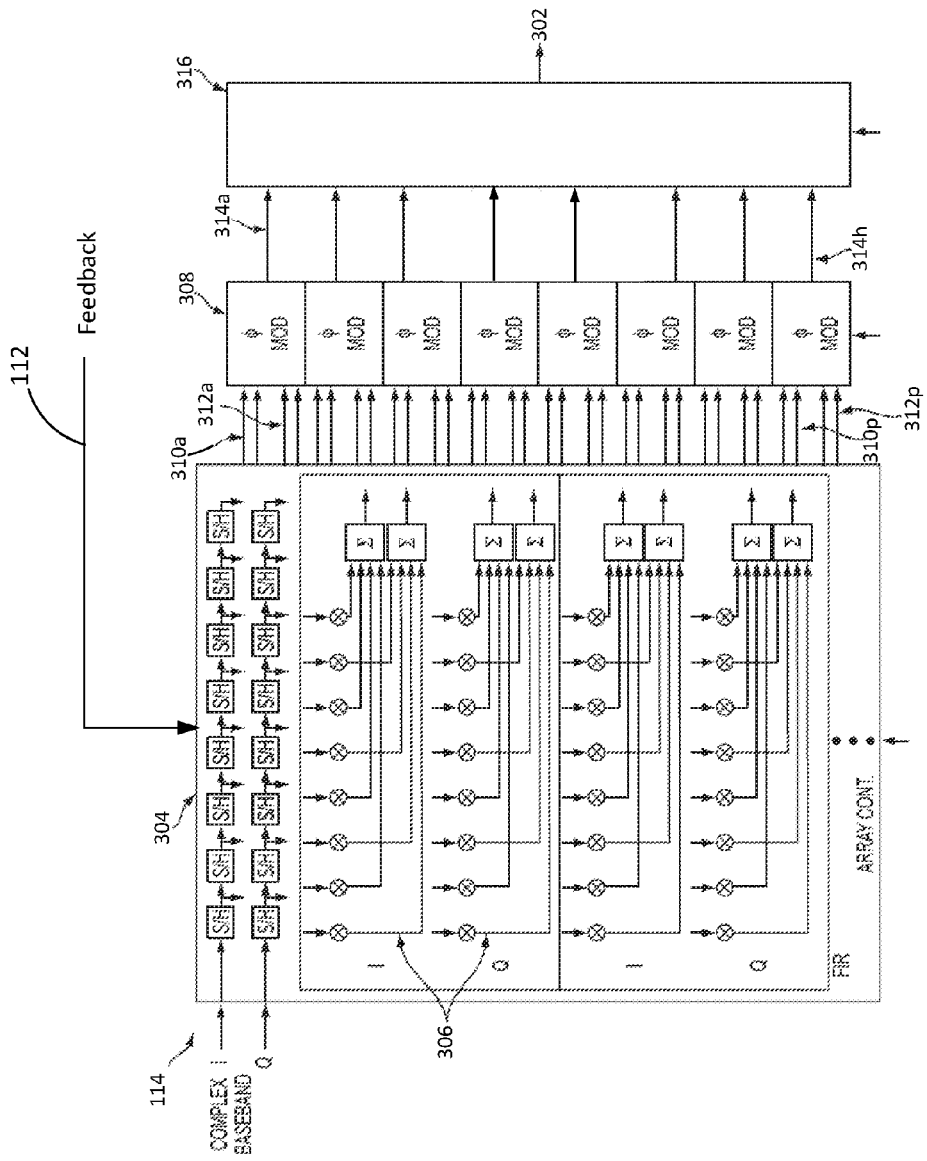
FIG. 4 is a schematic diagram of a low-pass filter included in a bandpass downsampler of an adaptive channelizer according to a non-limiting embodiment.

With reference to FIG. 4, and adaptive filter 114 included in the adaptive channelizer 100 is illustrated according to a non-limiting embodiment. In at least one embodiment, the adaptive filter 114 is an adaptive (i.e., tunable) polyphase decimating finite impulse response (FIR) filter array 114 and is configured to process one or more input signals, such as a complex RF input signal (I, Q) for example, from a number of baseband channel inputs to generate a steered output RF signal 302.

The adaptive FIR filter 114 may operate as both a bandpass filter and a low-pass filter as needed so as to independently adapt (i.e., tune) an individual channel. The adaptive FIR filter 114 may include 16 taps and can be driven by a 3.25 GHz clock. The analog bandwidth of the adaptive FIR filter 114 may reach up to 12 GHz. In addition, the adaptive FIR filter 114 may utilize multiple coefficients at 10-bit resolution and operate at 89 mW active power with bias set for a 70 dB dynamic range.

According to a non-limiting embodiment, the adaptive FIR filter includes an adaptive filter unit 304 and 306 and one or more Fourier transform units 308. The adaptive filter unit 304 is configured, for example, as an adaptive polyphase decimating finite impulse response (FIR) filter array, and is capable of converting a plurality of polyphase signals into one or more up-sampled baseband channels (e.g., I/Q channels). In at least one embodiment a channelizer 100 can be in signal communication with the adaptive FIR filter 114. In this manner, common nodes can be formed such that the adaptive FIR filter unit 304 can re-use circuit blocks from the channelizer 100.

The adaptive FIR filter 114 includes a plurality of sample and hold (S/H) circuits. In at least one embodiment, the S/H circuits are paired to correspond to a respective pair of I/Q channels. Each S/H pair 305 also corresponds to a channel output 314a-314h. The baseband channels are routed to a plurality of FIR filter branches 306 which are in signal communication with the Fourier transfer units 308. The branches 306 can be dynamically tapped to actively reconfigure the adaptive filter unit 304. The Fourier transform units 308 take in one or more baseband channels such as, for example, I/Q odd channels 310a and I/Q even channels 312a, and generates a number of real signal outputs 314. For example, two I input signals 310a and two Q signals 312a are combined to produce a real output 314a, such that from sixteen I/Q channels 310a-310p/312a-312p, eight real channels 314a-314h are formed.

Figure 3:
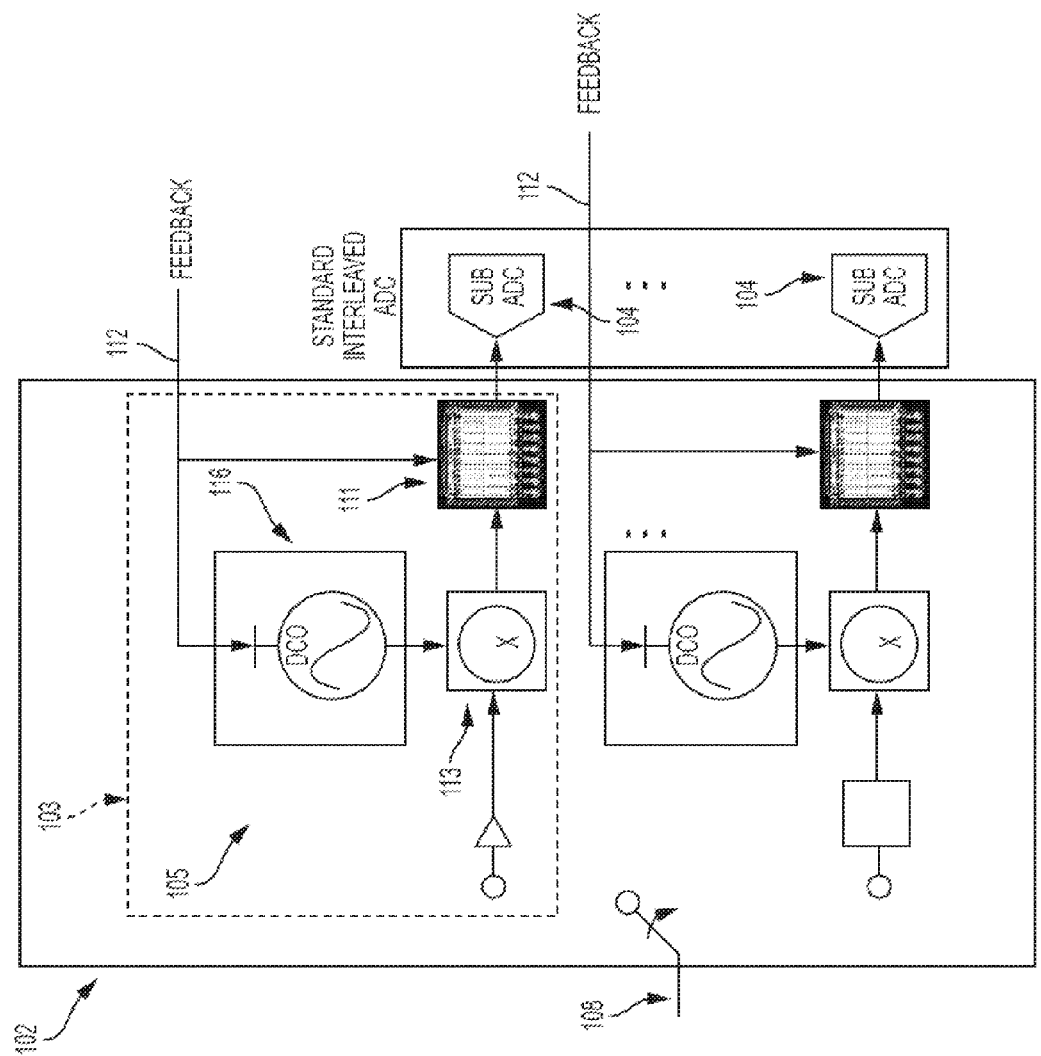
FIG. 3 is a block diagram of a bandpass downsampler included in a channel of an adaptive channelizer according to a non-limiting embodiment.

The outputs 314a-314h are delivered to an electronic commutator unit 316 which samples one or more of the real output signals 314a-314h. For example, a first channel 314a is output on a first clock cycle, a second sample is output on a second clock cycle, etc. According to an embodiment, the commutator unit 306 receives eight real channels 314a-314h from the Fourier transfer units 306. The real channels 314a-314h are up-sampled and are clocked at 3.25 GHz rate, for example. The commutator unit 306 combines the real channels 314a-314h to form a single output signal 302 that is clocked at, for example, 26 GHz. According to the non-limiting embodiment illustrated in FIG. 3, the adaptive FIR filter unit 304 and the Fourier transform units 308 are all clocked at 3.25 GHz, for example, and the commutator unit 316 is clocked at, for example, 26 GHz.

In at least one embodiment, the electronic commutator unit 316 is disposed as the last stage. Thus, the adaptive FIR filter 114 converts eight real channel inputs 314*a*-314*h*, for example, into a single RF output 302 whereas the channelizer 100 includes a commutator disposed in the first stage which receives a single real input signal and produces eight channels, for example. It is appreciated that any number of input channels can be used. Accordingly, if the adaptive FIR filter 114 allows four sets of complex input channels and data is only provided through one of the channels, the other remaining channels can be "grounded" and left unused. A number of digital to analog converters can be included to provide the inputs to these complex baseband channels into the adaptive FIR filter 114.

According to at least one embodiment, an FIR filter unit 304 as shown in FIG. 4 can be used to implement down conversion to baseband and filtering, known as bandpass sampling. The coefficients of the FIR filter unit 304 can be digitally programmed via the feedback control line 112, for example. Accordingly, the FIR filter unit 304 provides a very flexible filter capable of implementing an arbitrary filter shape, which is controlled by the number of filter taps. In at least one embodiment, the FIR filter coefficients are set to create a bandpass filter to pass a signal at a certain non-zero frequency.

Various subsampling techniques can then be used such that once the signal is bandpass filtered. In at least one embodiment, a sampling rate much lower than the Nyquist criterion can be used to alias the signal down to baseband. For example, an initial signal with bandwidth of about 10 MHz can be digitized at a center frequency of about MHz 200 to about 210 MHz by utilizing the FIR filter unit 304 as a bandpass filter that is set at approximately 200 MHz to approximately 210. The resulting signal can then be sampled at approximately 50 MHz, for example. The digitized signal (i.e., the signal digitized at about 200 MHz to about 210 MHz) is aliased down to approximately a 50 MHz sampling window. It should be appreciated that the frequency values described above are merely examples, and that other frequencies may be implemented. A low-pass filter can then be applied to the sampled signal to filter out the aliases thereby obtaining the information that was carried on the digitized signal. In this manner, the FIR filter unit 304 is utilized to bandpass filter and then downsample the initial signal. In at least one embodiment, an array of FIR filter units 304 set to bandpass different frequency channels can be used to create a channelizer.

Figure 5:
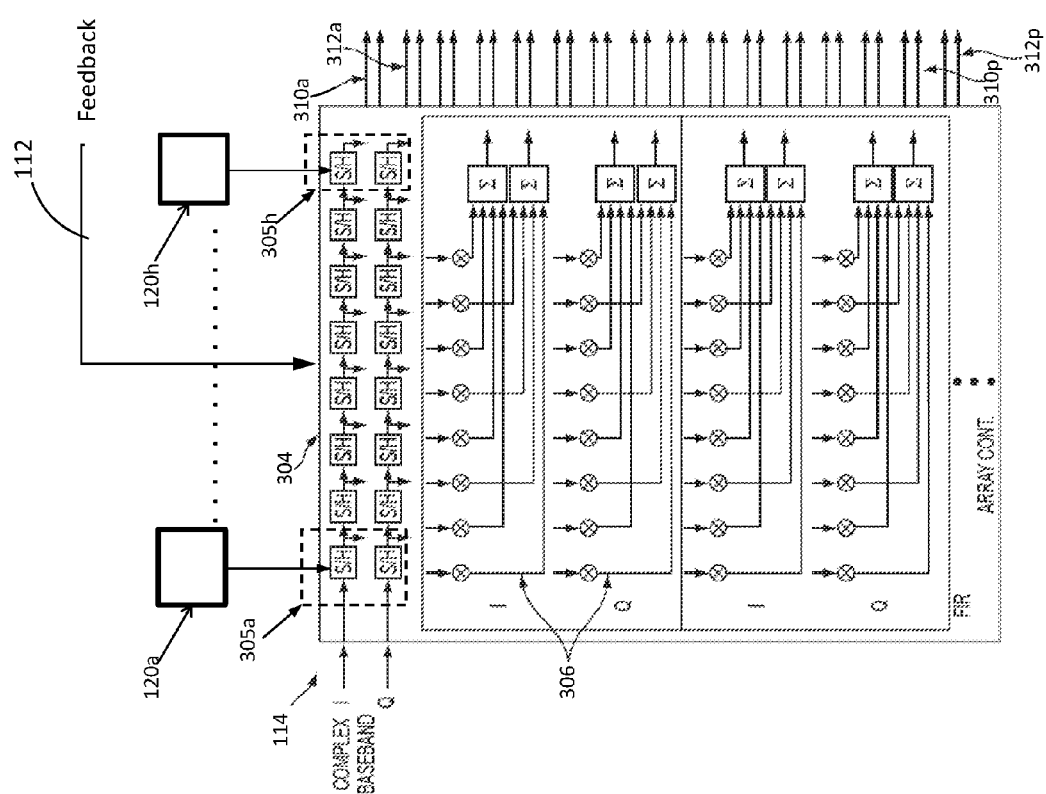
FIG. 5 is a schematic diagram of a low-pass filter included in a bandpass downsampler of an adaptive channelizer according to a non-limiting embodiment.

In another embodiment illustrated in FIG. 5, the adaptive FIR filter 114 is configured as an adaptive discrete-time band-select filter 114 as illustrated in FIG. 4. In this case, the feedback signal 112 is utilized to determine a band of frequency that should be selected and applied to one or more individual channels based on the detected energy in a respective channel of the channel array. The adaptive discrete-time band-select filter 114 includes a plurality of sample and hold (S/H) units. In at least one embodiment, the S/H units are paired to correspond to a respective pair of I/Q channels. Each S/H pair 305*a*-305*h* also corresponds to a respective channel output 314*a*-314*h*.

The adaptive discrete-time band-select filter 114 also includes a plurality of clocks 120*a*-120*h*. Each clock 120*a*-120*h* is configured to provide a clock-rate to a respective channel. The clock-rate generated by each clock 120*a*-120*h* is out of phase with respect to one another to generate a clocked phase progression. That is, each S/H pair 305*a*-305*h* is clocked at a different time off-set. In this manner, a polyphased RF signal is output from the adaptive discrete-time band-select filter 114. The adaptive discrete-time band-select filter 114 can select the desired frequency of one or more of the channels. In at least one embodiment, the adaptive discrete-time band-select filter 114 may select a frequency for each individually with respect to one another.

Figure 6:
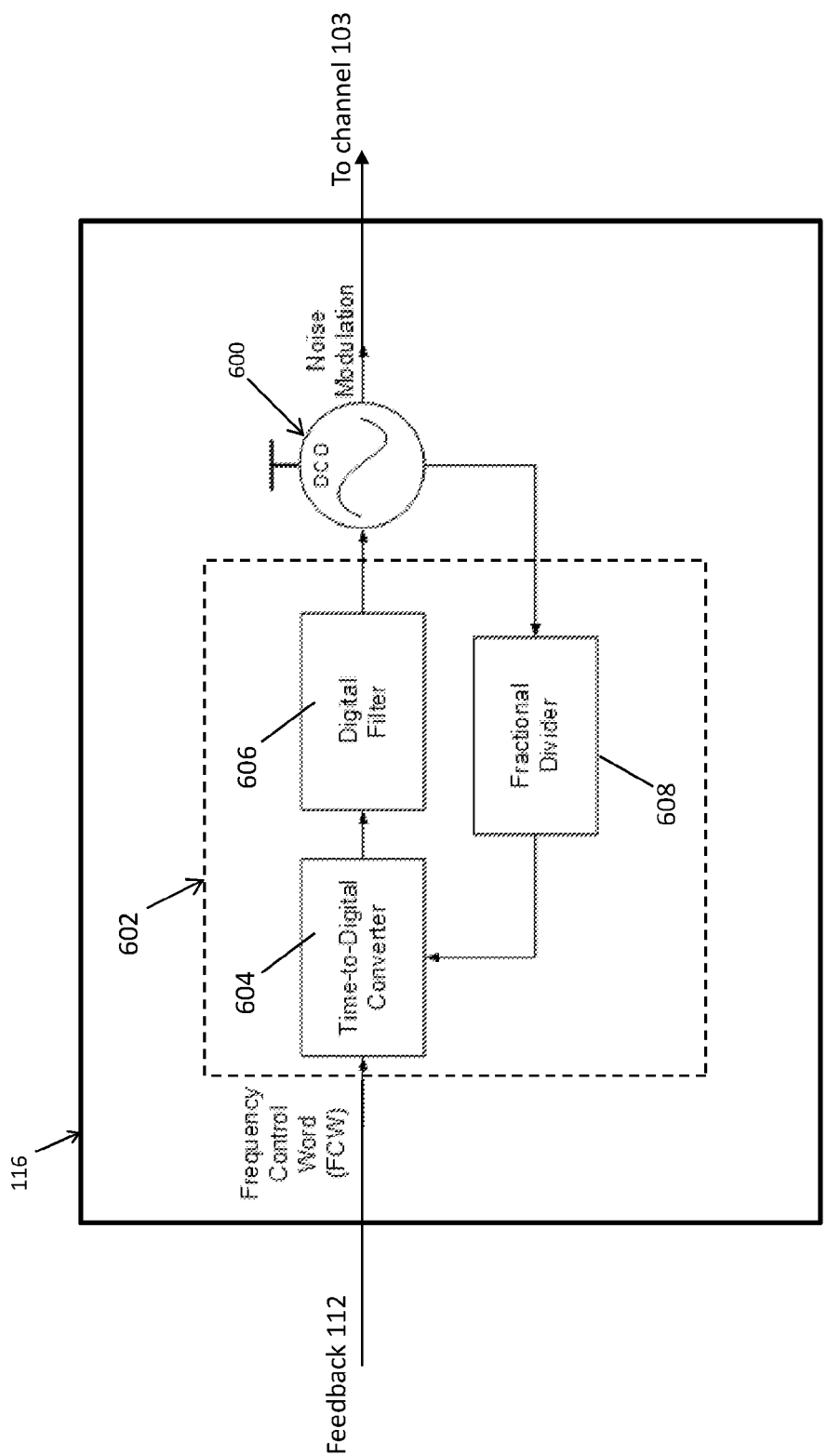
FIG. 6 is a block diagram of a digitally controlled oscillator unit included in a bandpass downsampler of an adaptive channelizer according to a non-limiting embodiment.

Referring now to FIG. 6, a DCO unit 116 included in a bandpass downsampler of an adaptive channelizer is illustrated according to a non-limiting embodiment. The DCO unit 116 includes a DCO 600 in signal communication with a local oscillating (LO) control circuit 602. The DCO 600 outputs a LO frequency signal to a respective channel 103 according to the parameters set by the LO control circuit 602. In this manner, the LO frequency signal output by the DCO 600 can actively tune a center of frequency of the respective channel 103.

The LO control circuit 602 includes a time-to-digital converter (TDC) 604, a digital filter 606, and a fractional divider 608. The TDC 604 receives the feedback signal 112. In at least one embodiment, the feedback signal 112 is a frequency control word (FCW). Accordingly, the TDC 604 converts the FCW into a digital feedback signal indicative of the channel parameters generated in response to detecting a dynamic range event of the respective channel 103. The digital filter 606 filters out noise from the digital feedback signal. In response to receiving the filtered digital feedback signal, the DCO 600, adjusts the LO frequency signal so as to tune the center of frequency of the channel 103. The fractional divider circuit 608 monitors the local oscillating frequency signal of the DCO 600 and outputs a local feedback signal to the TDC 604 so as to regulate an operating frequency of the DCO unit 116.

Figure 7:
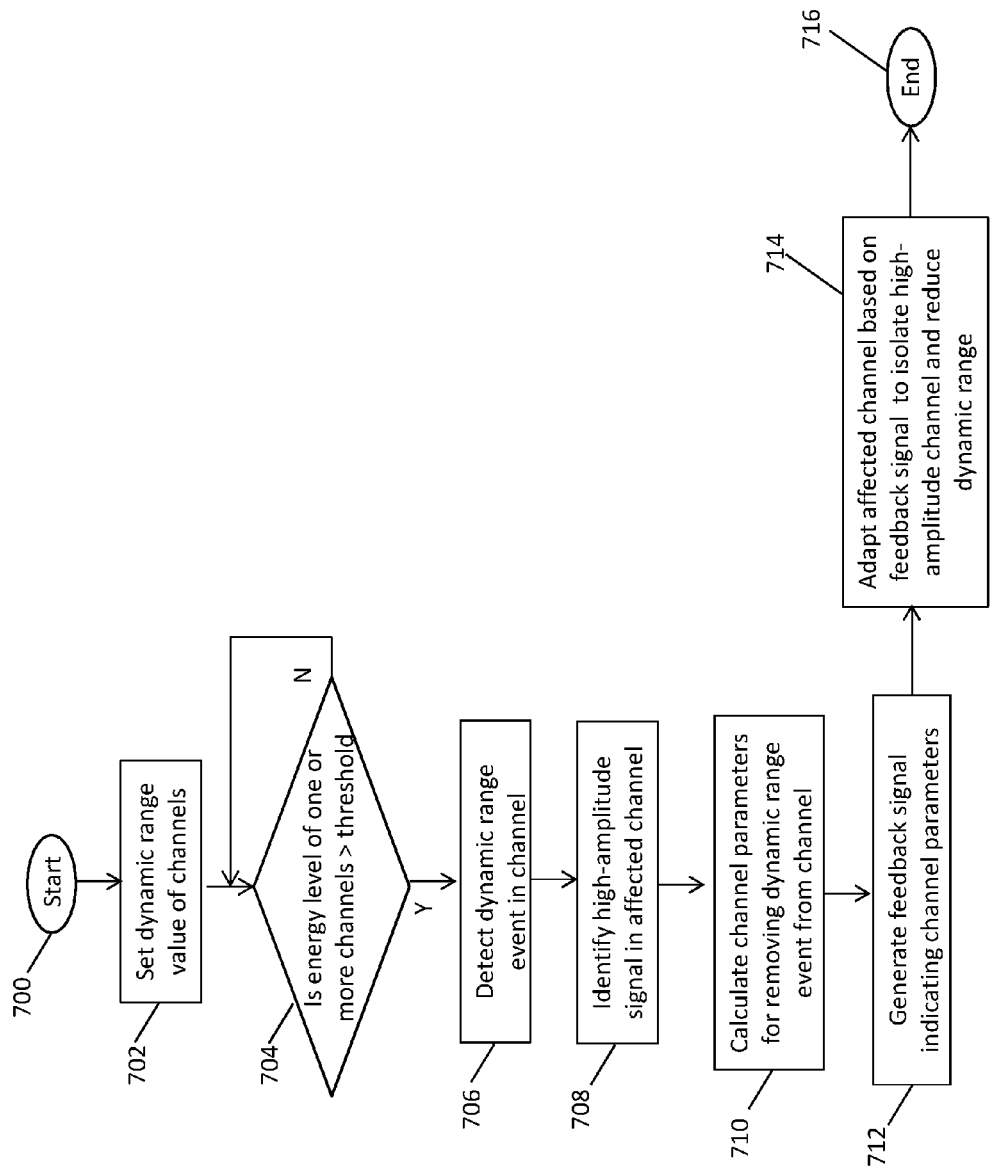
FIG. 7 is a flow diagram illustrating a method of controlling a dynamic range of an adaptive channelizer according to a non-limiting embodiment.

FIG. 7 is a flow diagram illustrating a method of controlling a dynamic range of an adaptive channelizer according to a non-limiting embodiment. The method begins at operation 700, and at operation 702 a channel size defined by a bandwidth and gain is set for one or more channels of an adaptive channelizer. At operation 704, a determination as to whether one or more channels exceed an energy level threshold is performed. When the energy level of a channel is below the threshold, the method returns to operation 704 and continues monitoring the energy level of the channel. When, however, the energy level exceeds the threshold, the channel is determined to experience a dynamic range event (e.g., a saturated channel, under-power signal event, etc.) at operation 706. In at least one embodiment, energy level comparison may be performed at an analog stage (i.e., in the adaptive channelizer) or at a digital stage (i.e., by a digital controller connected to the adaptive channelizer).

At operation 708, one or more high-amplitude signals in the affected channel is detected. In at least one embodiment, the amplitude of a signal is compared to an amplitude threshold. When the threshold exceeds the amplitude threshold, the signal is determined to be a high-amplitude signal. At operation 710, channel parameters for removing the dynamic range event (removing the saturation or removing the under-power signal event) from the channel are determined. The channel parameters include, but are not limited to, a center of frequency, bandwidth, and gain. At operation 712, a feedback signal indicative of the channel parameters is output. In at least one embodiment, the channel parameters are determined and calculated by an electronic controller in signal communication with the adaptive channelizer. At operation 714, the adaptive channelizer receives the feedback signal. Based on the feedback signal, the adaptive channelizer adapts (i.e., actively adjusts) the channel so as to isolate the high-amplitude signal and reduce the dynamic range of the affected channel, and the method ends at operation 716.

As described above, various embodiments described herein provide an adaptive analog channelizer capable of increasing system level dynamic range. For instance, one or more channels of the channelizer may be set to an initial channel size having a bandwidth and gain. When a dynamic range event occurs (e.g., saturated channel, under-powered signal event, etc.), one or more high-amplitude channels are isolated such that the dynamic range of the affected channel is returned to the initial channel size or is even reduced below the initial channel size. In at least one embodiment, each channel includes a programmable digitally control oscillator that applies a locally oscillating (LO) frequency and an adaptive filter. In this manner, the channel is adapted by adjusting the center frequency, bandwidth and/or gain of one or more channels with parameters such that no channel will require more than a selected dynamic range. This selected dynamic range may be much less (e.g., 50 dB) than what is achieved by conventional analog channelizers. Accordingly, the dynamic range required per channel and per ADC is greatly reduced compared to conventional analog channelizers. In addition, adaptively changing the size of a channel allows for adaptively or dynamically tuning the probability of multiple signals falling in the same channel.

As used herein, the term "module" or "unit" refers to an application specific integrated circuit (ASIC), an electronic circuit, an electronic hardware computer processor (shared, dedicated, or group) and memory that executes one or more software or firmware programs, a combinational logic circuit, hardware electronic controller, and/or other suitable components that provide the described functionality. When implemented in software, a module can be embodied in memory as a non-transitory machine-readable storage medium readable by a processing circuit and storing instructions for execution by the processing circuit for performing a method.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

While the preferred embodiments to the invention have been described, it will be understood that those skilled in the art, both now and in the future, may make various improvements and enhancements which fall within the scope of the claims which follow. These claims should be construed to maintain the proper protection for the invention first described.

What is claimed is:

1. A signal identification system, comprising:
    an analog adaptive channelizer including a plurality of channels, each channel having a channel size defined by a bandwidth and a gain; and
    an electronic signal identification (ID) controller in signal communication with the analog adaptive channelizer, the ID controller configured to determine a dynamic range event that modifies an energy level of an affected channel among the plurality of channels and outputs a feedback signal including channel parameters based on the dynamic range event,
    wherein the analog adaptive channelizer actively adjusts at least one of the bandwidth and the gain of the affected channel based on the feedback to change the channel size of the affected channel, and
    wherein actively adjusting the affected channel includes adjusting channel characteristics of the affected channel such that the high-amplitude signal is isolated in the affected channel thereby reducing the dynamic range of the affected channel, and wherein the dynamic range event includes a channel saturation event, or an under-powered signal event, the channel characteristics including adjusting a bandwidth of the affected channel and adjusting a center of frequency of the affected channel based on the channel parameters indicated by the feedback signal.

2. The signal identification system of claim 1, wherein signal ID controller compares a power level of at least one signal in the affected channel to a power level threshold and identifies the least one signal as a high-amplitude signal when the power level of the at least one signal exceeds the power level threshold.

3. The signal identification system of claim 1, wherein each channel among the plurality of channels includes a digitally controlled oscillator (DCO) unit configured to actively adjust a center of frequency of a respective channel based on the feedback signal.

4. The signal identification system of claim 3, wherein each channel among the plurality of channels includes an adaptive filter is configured to actively adjust a bandwidth of a respective channel based on the feedback signal.

5. The signal identification system of claim 4, wherein the adaptive filter is an adaptive polyphase decimating finite impulse response (FIR) filter array.

6. An adaptive channelizer, comprising:
    a plurality of channels having a channel size defined by a bandwidth and a gain, each channel comprising:
        a digitally controlled oscillator (DCO) unit configured to generate a local oscillating frequency signal based on a feedback signal that is output in response to a dynamic range event of an affected channel among the plurality of channels, the dynamic range event modifying an energy level of the affected channel;
        a mixer in signal communication with the DCO unit, the mixer configured to apply the local oscillating frequency signal to the affected channel thereby adjusting a center of frequency of the affected channel; and
        an adaptive filter unit in signal communication with the mixer, the adaptive filter unit configured to actively adjust a bandwidth of the affected channel based on the feedback signal,
    wherein the adjusted center of frequency and the adjusted bandwidth changes the size of the affected channel to remove the dynamic range event.

7. The adaptive channelizer of claim 6, wherein the feedback signal includes channel parameters based on the dynamic range event, and the adjustment of the center of frequency and the bandwidth isolates a high-amplitude signal having power level that exceeds a power level threshold such that the dynamic range of the channel is reduced.

8. The adaptive channelizer of claim 7, wherein the adaptive filter is an adaptive polyphase decimating finite impulse response (FIR) filter array.

9. The adaptive channelizer of claim 8, wherein the adaptive polyphase decimating finite impulse response (FIR) filter array comprises:
- a plurality of clock units, each clock unit generating a clocked-output having a different clock-rate with respect to one another; and
- a plurality of sample and hold (S/H) circuits, each S/H circuit receiving the clocked-output from a respective clock unit such that each S/H circuit is clocked at a different time off-set such that a polyphased RF signal is output from the adaptive polyphase decimating finite impulse response (FIR) filter array.

10. The adaptive channelizer of claim 6, wherein the DCO unit comprises:
- a time-to-digital converter (TDC) configured to convert the feedback signal into a digital feedback signal, the feedback signal being a frequency controlled word (FCW);
- a digital filter configured to output a filtered digital feedback signal based on the digital signal generated by the TDC;
- a DCO that varies the local oscillating frequency signal based on the filtered digital feedback signal to actively adjust the center of frequency of the channel; and
- a fractional divider circuit that monitors the local oscillating frequency signal and outputs a local feedback signal to the TDC so as to regulate an operating frequency of the DCO unit.

11. The adaptive channelizer of claim 10, wherein the adaptive channelizer receives the feedback circuit in response to outputting the dynamic range event detection signal.

12. The adaptive channelizer of claim 6, further comprising an energy detection circuit that compares an energy level of the channel to a reference value, and outputs a dynamic range event detection signal in response to the energy level exceeding the reference value, wherein the dynamic range event includes a channel saturation event, or an underpowered signal event.

13. A method of controlling a dynamic range of an adaptive channelizer including a plurality of channels having a channel size defined by a bandwidth and a gain, the method comprising:
- determining a dynamic range event that modifies an energy level of an affected channel among the plurality of channels;
- outputting a feedback signal including channel parameters based on the dynamic range event; and
- actively adjusting the channel size of the affected channel based on the feedback to reduce a dynamic range of the affected channel to the set dynamic range value or below the set dynamic range value,
- wherein actively adjusting the affected channel includes adjusting channel characteristics of the affected channel such that the high-amplitude signal is isolated in the affected channel thereby reducing the dynamic range of the affected channel, and wherein the dynamic range event includes a channel saturation event, or an underpowered signal event, the channel characteristics including adjusting a bandwidth of the affected channel and adjusting a center of frequency of the affected channel based on the channel parameters indicated by the feedback signal.

14. The method of claim 13, further comprising comparing a power level of at least one signal in the affected channel to a power level threshold and identifying the least one signal as a high-amplitude signal when the power level of the at least one signal exceeds the power level threshold.

15. The method of claim 13, further comprising applying a tunable local oscillating frequency generated by a digitally controlled oscillator (DCO) unit to the affected channel to actively adjust the center of frequency of a respective channel based on the feedback signal.

16. The method of claim 15, wherein each channel among the plurality of channels includes an adaptive filter that is configured to actively adjust a bandwidth of a respective channel based on the feedback signal.

* * * * *